United States Patent
Cooper et al.

[11] Patent Number: 5,946,049
[45] Date of Patent: *Aug. 31, 1999

[54] APPARATUS AND METHOD FOR SYNCHRONIZING MULTIPLE ASYNCHRONOUS SIGNALS

[75] Inventors: J. Carl Cooper, Monte Sereno; Howard Loveless, Ben Lomond; David Wallen, San Francisco; Mirko Vojnovic, Santa Clara, all of Calif.

[73] Assignee: Pixel Instruments Corp., Los Gatos, Calif.

[ * ] Notice: This patent is subject to a terminal disclaimer.

[21] Appl. No.: 08/573,468

[22] Filed: Dec. 15, 1995

Related U.S. Application Data

[63] Continuation-in-part of application No. 08/096,240, Jul. 26, 1993, Pat. No. 5,550,594.

[51] Int. Cl.[6] .................................................. H04N 9/475
[52] U.S. Cl. .......................... 348/513; 348/512; 348/715
[58] Field of Search .................................. 348/512, 513, 348/514, 516, 517, 518, 584, 554, 715; H04N 9/475

[56] References Cited

U.S. PATENT DOCUMENTS

| | | | |
|---|---|---|---|
| 4,018,990 | 4/1977 | Long et al. | 348/513 |
| 4,485,402 | 11/1984 | Searby | 348/715 |
| 5,442,636 | 8/1995 | Bontekoe | 348/509 |

*Primary Examiner*—Michael H. Lee
*Attorney, Agent, or Firm*—J. Carl Cooper

[57] ABSTRACT

This invention is a method and apparatus for synchronization high quality video like signals. The preferred embodiment is described to synchronize a plurality of mutually unsynchronized video signals as well as passing one or more associated secondary signal with each video signal with a corresponding delay. The selection of one of a plurality of reference signal candidates is shown along with the use of the input signal to provide a fixed delay.

32 Claims, 2 Drawing Sheets

APPARATUS AND METHOD FOR SYNCHRONIZING MULTIPLE ASYNCHRONOUS SIGNALS

This application is a continuation in part of, and incorporates by reference in its entirety, U.S. patent application Ser. No. 08/096,240 filed Jul. 26, 1993 U.S. Pat. No. 5,550,594, as if it were fully set out herein.

BACKGROUND OF THE INVENTION

1. Field of the Invention

The present invention relates to the field of synchronizing asynchronous signals and finds particular use in synchronizing multiple video type signals in television systems.

2. Description of the Prior Art

The prior art contains many circuits for video synchronizers, beginning with U.S. Pat. No. 4,018,990. These synchronizers generally provide video synchronization by sampling and digitizing the active video portion of a video signal in response to the timing thereof, or in the case of digital video signals recovering the clock and digital samples therefrom, storing the digitized video in a memory. The digitized video is read from the memory at a proper time in response to a reference signal to achieve synchronization thereof. In some devices the digitized video is converted back to a more desirable form, digital or analog or both. Some devices reconstruct and combining the appropriate ones of sync, burst and blanking with the read video.

Video synchronizers for use with single video signals are commonplace in the industry, with multiple video signals being accommodated by use of multiple complete video synchronizers, each being fully self contained. Various techniques and circuits to perform these functions are well known in the art, and emphasis has been placed on improving performance in terms of minimizing noise and distortion from the digitizing process, and improving the immunity of the devices to noise or errors which may be carried with or interfere with the signal which is being synchronized.

SUMMARY OF THE INVENTION

The inventive video synchronizer and improvements described herein are designed to allow synchronization of high quality video like signals in analog or digital form (which may include compressed digital form such as MPEG, etc.), while providing minimum distortion and maximum transparency. The invention is particularly well suited for efficiently synchronizing multiple video type signals of mixed or matched form to a desired reference signal. It will be recognized that the inventive teachings herein may be applied equally to analog signals in analog component, composite, serial and parallel and digital data streams in digital serial, parallel, component, composite and compressed form, as well as other forms and standards of electronic signal conveyance.

Because full sync tip to peak white video may be digitized in the analog preferred embodiment shown herein, one would normally expect quantizing errors to be significant. The inventive features of the preferred analog embodiment however show the use of sophisticated digital signal processing techniques such as oversampling and interpolation, such that these errors are kept to unexpected low levels.

The inventive concepts described herein are applicable for many analog and digital video signal standards, including but not limited to MONOCHROME, SECAM, PAL, NTSC and HDTV versions in analog form, for example the well known RS-330 and RS-170 standards, as well as digital form, for example the well known SMPTE 259 and 260 standards or compressed digital form, for example JPEG, MPEG 1 and MPEG 2. Other functions may be combined with the synchronizing function, for example standards conversion, compression and decompression, noise reduction, oversampling and filtering. Such additional functions will be referred to herein and in the claims as filtering, and will be understood to include such additional functions.

In the preferred embodiment of the invention it is taught to store and pass one or more secondary signal with the video signal in fashion which maintains proper time relationship between the video signal and the secondary signal.

The inventive concepts described herein are well suited for use in synchronizing satellite, microwave and telephone feeds, inter-suite connections and in house signals, thus eliminating the use of expensive and cumbersome multiple genlocking and timing schemes.

Objects of the invention include:

An improved video synchronizer as described in application Ser. No. 08/096,240 incorporated herein by reference, A video synchronizer for multiple video signals of the same or different form for which the circuitry for each video signal may be separately constructed and which may be installed in various case configurations, with the common circuitry being shared by the multiple circuits.

A multiple electronic signal synchronizer configuration in which a single genlock circuit may be utilized to provide reference signals for multiple signal synchronizers, while retaining individual genlock phase controls for each output electronic signal.

A signal synchronizer in which one of the input signals is used as the reference.

A multiple electronic signal synchronizer which is configured to be used as an adjustable, fixed length delay, which use may be automatically switched.

A multiple signal synchronizer configured to use a selected one of the input signals as the reference to synchronize a plurality of input signals to one of the plurality, with the selection of the reference being automatically switched under known conditions.

A signal synchronizer capable of using recursive and nonrecursive adaptive filtering for noise reduction, image enhancement or other features.

A signal synchronizer capable of storing a full repetition period of the signal in memory. A video signal synchronizer capable of storing the entire video signal, including associated sync, timing, error checking and ancillary signals or portions so as to pass those signals or portions in addition to the active video portions.

A video synchronizer capable of selecting ones of the portions outside of the active video so that those portions may be preserved and passed or reconstructed and reinserted in the stored signals from the memory.

A video signal processing device having a memory for the video signal and having an additional memory capability for one or more related or unrelated secondary signals in order to achieve proper time relationship of the secondary signals with respect to the associated video signal.

These and other objects of the invention will become apparent to one skilled in the art from the description herein, taken in conjunction with the attached drawings.

DESCRIPTION OF THE PREFERRED EMBODIMENT

Figure 1:
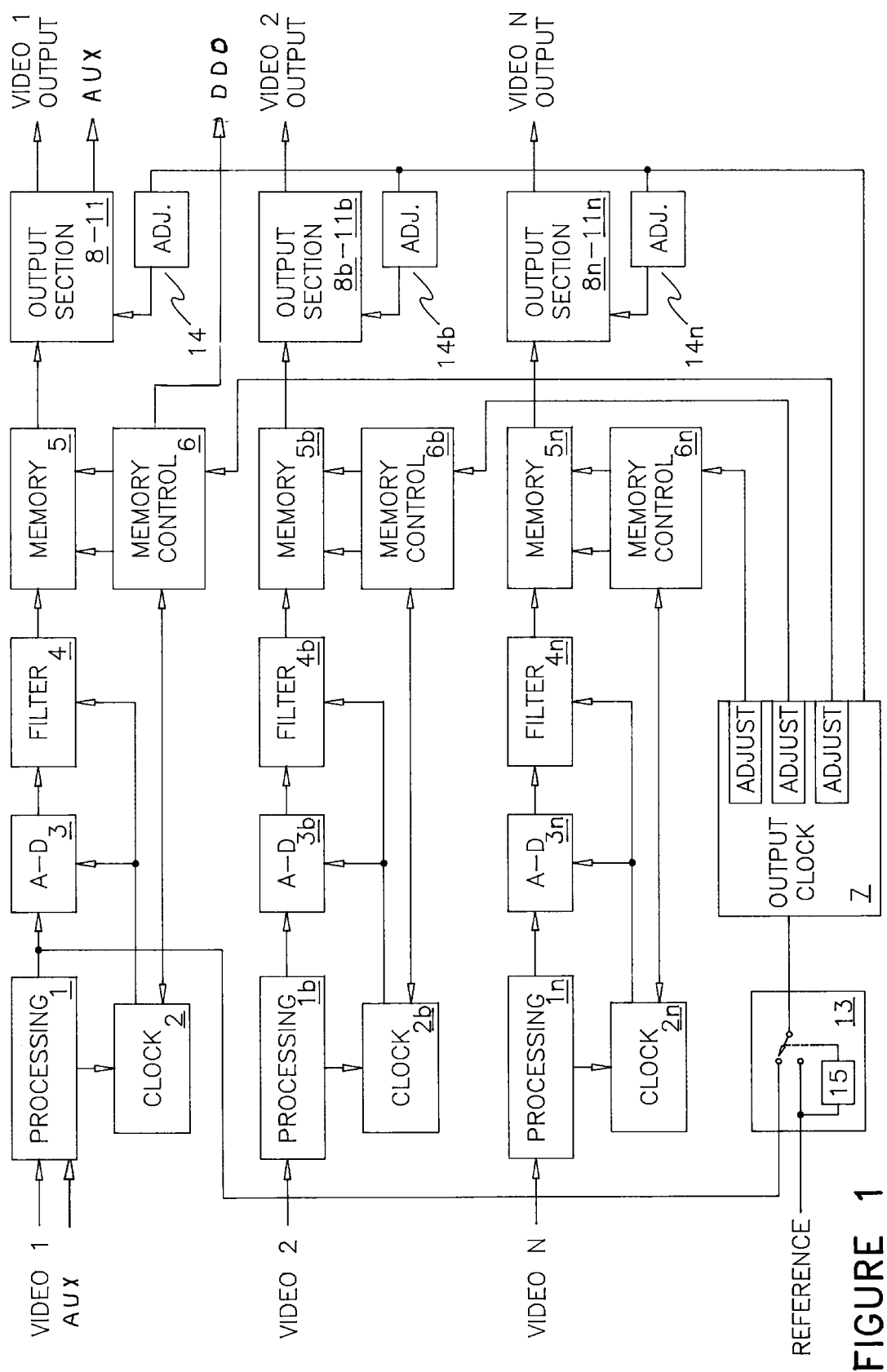
FIG. 1 is a block diagram of a multiple synchronizer system of the preferred embodiment of the invention as used with analog to digital convertors.

The preferred embodiment described herein is applicable for use with reference signals of a type similar to the commonly used black burst signal or component or composite digital signals. Alternatively, other signals may be utilized for reference, for example individual ones of clock, subcarrier, H and V sync and field one reference, or compressed digital signals such as MPEG or JPEG types, which signals may be utilized in respect to the multiple synchronizer configuration described herein.

In the preferred embodiment a multiple synchronizer configuration is used with the ability to install individual signal path circuit for each incoming electronic signal to be synchronized, with each of the individual signal path circuits being adapted to operate with the specific form of the signal. For example video signals such as analog, SMPTE 259, MPEG, JPEG, etc. and various associated signals such as analog and digital audio, time code, machine control as well as other related or unrelated secondary signals may all be synchronized by combining individual signal path circuits for each signal. In this fashion, a single case containing power supply and genlock, as well as desired ones of special effects, remote control and/or other common signal processing functions may be utilized. It will be appreciated that such a case will also be fitted with the desired number and combination of individual signal path circuits which carry the electronics which are necessary for and specific to the form or type of signal to be synchronized. In this fashion, multiple collections of signals of differing types may be conveniently accommodated and synchronized.

It will be understood that the phrases signal path and signal path circuits will refer to accommodating at least one signal, but may also refer to accommodating multiple signals, since circuits accommodating individual signals may be combined, with common elements, for example the memory and memory controller, being shared. For example, analog signal paths may be constructed together to allow multiple analog signals to be accommodated. Similarly digital signal paths may be combined. A digital program signal path may be constructed to accommodate a digital video signal and associated digital audio signals.

One of the novel features of the multiple synchronizer configuration taught herein is the ability to utilize a single genlock circuit to select the reference to which each of the multiple signals which are input to the synchronizer configuration are synchronized or timed. The genlock circuit is preferred to be capable of alternately selecting one of an external reference or the video signals to be synchronized for use. Such selection is preferred to be available as automatic or operator selectable, as desired by the operator. In the automatic operation, a hierarchy of selections may be specified, for example the operator might set the following criteria for selection:

highest priority, external digital reference
next priority, external analog reference
next priority, first video to be synchronized
next priority, second video to be synchronized Using this plan, if the external digital reference is present it is used, otherwise the analog reference is used if it is present, otherwise the first video to be synchronized is used if it is present, otherwise the second video is used. This feature of the invention may be utilized to accommodate any number of signals.

Unlike other synchronizers which switch to an independent internally generated reference in the event that an external reference signal is not supplied or is lost, the preferred embodiment of the present invention teaches a capability to automatically switch to use the input video signal as the reference. This novel feature allows the synchronizer to be used as an adjustable, fixed length delay, useful for a variety of timing and other purposes. It will be appreciated that this capability may be used in conjunction with an internal reference however. For example, if none of the desired external signals or inputs is present, then the internal reference may be selected.

In the preferred embodiment it is desired to retain individual phase controls for adjustment of the output phase of each synchronized signal with respect to the reference signal. Such individual control is very useful since it is a frequent requirement to synchronize several input signals to a common reference signal. The individual controls may be located with, or part of, the common genlock circuit, or with each signal path, for example on the memory control circuit.

With the widespread use of digital video processing, audio synchronization is becoming a significant problem. The preferred embodiment of the invention shows inventive concepts which incorporate a digital delay output (DDO) which provides a steering signal to drive a companion audio synchronizer such as those described in U.S. Pat. Nos. 4,313,135 and 5,202,761, thereby providing accurate audio to video synchronization.

The preferred embodiment described herein may be constructed with commonly available parts. Specific attention is called to the family of digital video ICs which are supplied by Gennum Corporation of Toronto, Canada. These ICs provide all of the capability to interface serial video data streams to standard parallel sample data streams, such as those which are provided by the analog to digital converters and digital to analog converters shown in the earlier application. Gennum also provides ICs for operation with parallel video interconnection and for reconstruction and replacement of various synchronizing and other components outside of the active video portion of a digital signal. It will be recognized by one of ordinary skill in the art that the A-D and D-A circuitry may be replaced with the serial to parallel and parallel to serial convertor circuits supplied by Gennum in order to utilize the present invention with digital video signals. Attention is also called to the family of analog and digital ICs manufactured by Crystal Semiconductor of Austin, Tex. Crystal's ICs provide all of the capability of interfacing analog and digital associated signal such as audio, time code, control and other secondary signals in the signal path of the present invention. For example, Crystal supplies ICs for interfacing AES/EBU digital audio signals commonly associated with video signal with the memory circuitry 5 of the preferred embodiment.

Attention is further called to the several digital compression and decompression ICs supplied by manufacturers such as C-Cube, LSI logic and Zoran of San Jose, Calif. which ICs may be incorporated to facilitate use of the invention with compressed digital video, audio and associated signals for example as that which are compressed in accordance with JPEG or MPEG standards.

FIG. 1 shows a block diagram of a multiple channel video synchronizer system having a plurality of video inputs 1-N coupled to individual signal paths. The invention operates to synchronize each of the video inputs to a common reference signal. Each signal path consists of elements 1, 2, 3, 4, 5, 6, and 8–11 shown by way of example and all corresponding to the same numbered elements of the previous application, which may be referred to for detailed description. Each video signal is received by a processing circuit 1 which operates to prepare the video signal for conversion to digital in an A-D convertor 3 commonly referred to in the art as an ADC. A clock generator 2, generates a sampling clock commonly referred to as the write clock, which is preferred to be related to the input video signal, which sampling clock is coupled to the A-D 3 and filter 4. In addition, the clock circuit 2 operates to provide appropriate control and timing signals to the memory control 6, as well as to receive appropriate control and timing signals therefrom.

The digital video output from the A-D 3 is coupled to a filter circuit 4 where various filtering operations may take place as previously described. Alternatively, the filter circuit 4 may be eliminated if no filtering is desired. While the filter circuit 4 is shown operating on the video input to memory 5, it will be understood that 4 may operate on the video output from memory 5 before it is coupled to the output section 8–11, or may operate on both video input and video output from memory. The nature of the filtering may be recursive or nonrecursive or both as desired to implement a particular filtering application.

In the preferred embodiment, the filtered video from 4 (or alternatively the unfiltered video from 3) is coupled to the memory 5 where it is stored in response to the memory control 6, in response to the input signal synchronizing type components. The stored video is read out of the memory 5 under control of the memory control 6 in response to a timing signal provided by the output clock circuit 7. The read out of the video signal is responsive to the reference signal as facilitated by the reference signal selector 13 and the output clock circuit 7 which provides the timing signal. The stored video read out of the memory 5 is in effect a delayed version of the input signal, and thus can be said to be a delayed input signal which is synchronized with the reference signal.

The stored video read out of the memory 5 is coupled to the output section 8–11 where the video is operated on as previously described, for example to select portions contained within the non picture areas corresponding to said stored signal from said memory 5 in order that these selected portions may be preserved or passed and further to operate so that known ones of the repetitive portions of the non picture areas corresponding to said stored signals from said memory section are reconstructed or reconstituted in said stored signals from said memory section before it is output. The signal which is output from the output section 8–11 is thus also a delayed signal synchronized with the reference, but it has had additional processing performed upon it. For example, the embedded audio and test signals which are contained in the nonpicture area of the video signal may be selected to be passed unaltered while the active video may be operated on to change the gain or offset of one or more of the components, and the synchronizing type signals may be reconstituted in the signal. Thus since the video signal is delayed and processed, the output of 8–11 is a delayed version of the input video signal which is synchronized to the reference.

As previously described, 14 provides for fine adjustment of the video signal timing, for example to achieve the desired color subcarrier phase. Alternatively, this function may be combined in the memory controller 6.

FIG. 1 also shows an auxiliary signal path associated with Video 1, which shares the Video 1 signal path electronics. The auxiliary signal may be an associated signal such as an audio signal, or other secondary signal as previously described. It is important to note that in this manner the auxiliary signal may be synchronized to the reference signal, or may otherwise be delayed in relation to the video 1 signal in order to maintain proper timing relationship therewith. In many instances, it is desirable to mute, modify or otherwise act on the auxilary signal if the associated video signal is disrupted. For example in MPEG or other compressed data streams, the digital audio is likely to be corrupted if the digital video is disrupted. In this instance the output section 8–11 will be preferred to operate to provide such muteing or other action on said auxiliary signal in response to the detection of the disruption by 2 or alternatively response to the outputting of a frozen image by the memory 5.

FIG. 1 shows a common reference selector 13 which contains a reference detector 15 which operates to detect the presence of a given preferred reference signal, shown here by example as the external reference. If the preferred reference is present the selector 13 selects it to be used as the reference for the output clock circuit 7 (also known collectively as a genlock circuit) and if the external reference is not present a selected one of the plurality of input video signals, in the present example shown as the video 1 signal, is used.

A common output clock section 7 is shown to be utilized with the plurality of video signal paths. The clock and timing signals from 7 are coupled via individual adjustment controls to individual signal paths. The individual adjustments of 7 correspond to the H & V phase, and 14 to fine video phase adjustments of FIG. 1 of the parent application. These adjustments allow these parameters of each video output to be individually adjusted.

In the preferred embodiment, section 2 operates to detect when the input signal is disrupted, which may be performed by detecting when sync like pulses from the video are missing or misplaced, or when the input PLL is consequently unlocked. The information of the input being disrupted is used by the memory controller 6 to cause the memory 5 to cease storage of video samples and repetitively output an entire repetition period of stored samples of the previously input video during at least the pendency of the disruption. This action results in a frozen image being output from memory. Alternatively, the output processing section may be caused to output a known image, such as black for example, or to select another video signal. The output processing section may select the known image or other video after a time delay. For example after 5 seconds of frozen image the output processing section may fade to a message to standby. In addition, the output processing section may also operate to interact with the auxiliary signal as previously described.

While it is preferred to have only one output clock circuit 7, one skilled in the art will recognize from the present teachings that it is also possible to have more than one such circuit, thus allowing synchronization to a plurality of references. For example, 3 inputs might be synchronized to one reference and a different 3 inputs to another. Many other combinations are possible as well and one of ordinary skill in the art will know to adapt the circuitry of the present teachings to fit a particular need for the invention.

As shown with respect to the DDO (delay detector output) signal from memory control 6 in the diagram of FIG. 1, it will be appreciated from the teachings of the earlier application that the memory control 6 operates to output a delay signal which is representative of the delay which the signal undergoes in the memory. In the present example this delay is the same for both the AUX and Video 1 signal, however it may represent either delay. Such delay signal may be utilized to delay an associated signal by an amount to keep it properly timed with the signal whose delay through 5 it represents. For example it may be utilized to control the delay of an associated audio signal to match the delay of the Video 1 signal. In addition, it will also be appreciated that the memory 5 itself is shown to be configured to include appropriate circuitry to delay the associated AUX signal by an amount to keep it properly timed with the video signal.

Figure 2:
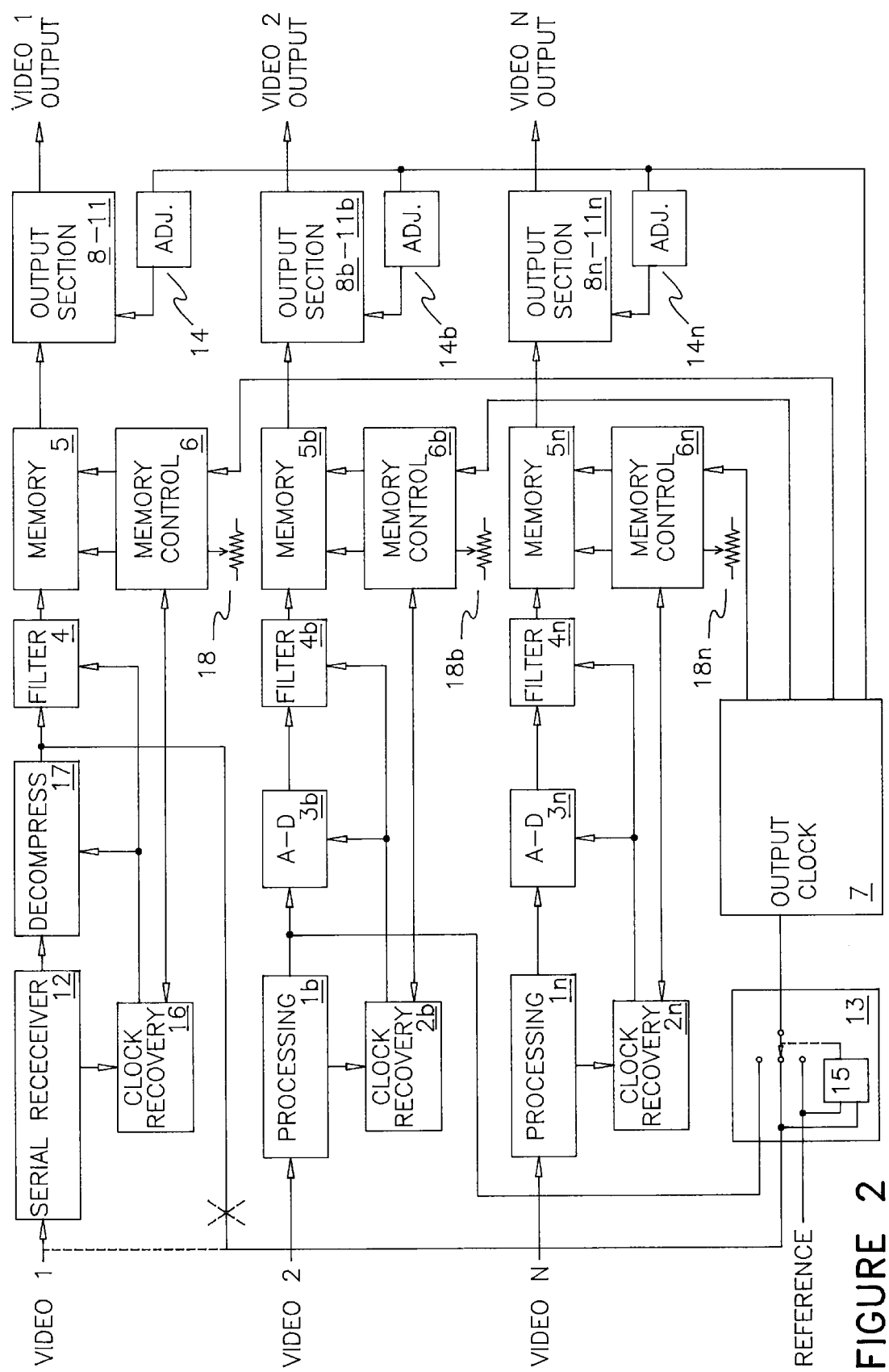
FIG. 2 is a block diagram of a multiple synchronizer system of the preferred embodiment of the invention as used with both analog and digital video signals.

FIG. 2 shows the preferred embodiment of the invention as used with digital signals. The embodiment of the invention shown in FIG. 2 is similar to that of FIG. 1, except that the first video input is shown as a digital input, and as with the earlier device of FIG. 1, the stored video read out of the memory 5 is coupled to the output section 8–11 where the video is operated on as previously described to pass, alter or reconstruct or reconstitute select portions contained within the non picture areas. For example, the embedded digital audio may passed unaltered while the active video may be operated on to change the gain or offset of one or more of the luma or chroma components, and the error checking and correcting signals recalculated and the SAV and EAV signals reconstituted.

FIG. 2 also shows individual timing controls 18 configured to allow the memory control 6 to provide adjustable timing of the output video signal with respect to the reference input signal selected by 13. This location of the adjustment is different than that of FIG. 1 in which the adjustment is provided as part of 7.

The reference selector 13 is seen to select one of the preferred reference, video 1 or video 2 in accordance with a hierarchy or other criteria or plan of selections which may be specified at the time of manufacture or by an operator as previously discussed. It is seen that 15 is responsive to the preferred reference and to video 1 to select one of the three aforementioned signals as the reference to be coupled to 7. It may also be seen in FIG. 2 that the video 1 signal which is utilized for reference may be taken before or after the serial receiver and decompression as appropriate, as shown by the dashed line connection. Similarly, the Video 2 or other signal may be utilized before of after processing and/or decompression as will be apparent to one of ordinary skill in the art from the teachings herein.

FIG. 2 shows elements 1–11 as in FIG. 1. In addition a serial digital receiver 12 is shown to receive the serial digital video 1 signal. Receiver 12 is coupled to a clock recovery circuit 16 to recover the clock and synchronizing components from the serial video, which clock and synchronizing components are used as are those of element 2. In addition a decompress circuit 17 is shown to provide for decompression of compressed video signals.

The serial receiver 12 and clock recovery circuitry are responsive to the serial digital video signal to recover the clock and synchronizing portions therefrom. Other types of digital signals may be accommodated as well and 12 and 16 will be understood to respond to such digital signals which also often contain synchronizing components such as start of active video (SAV), end of active video (EAV) which have different names and positions, and in some instances different functions, with respect to their analog counterparts, but which still are provided for the purpose of identifying portions or segments of the data stream.

Serial receiver 12 may also operate to receive embedded associated signals such as digital audio, time stamps, etc. for the uses previously described.

For the purposes of the present disclosure and claims the words synchronizing, synchronizing components, synchronizing portions and the like will be understood to apply to those portions of the signal which are utilized for such control and/or identification functions. When speaking of the purpose or use of such synchronizing related words, it will be understood to mean the intended usage as commonly known in the art as will be understood by one of ordinary skill in the art, even though the wording herein may differ from the commonly used wording.

As an example, when it is stated "synchronizing components define horizontal lines of active video" the "phrase synchronizing components" is intended to include the digital SAV and EAV values which define the start and end of active video for SMPTE 259 video, as well as other similar digital components, even though "synchronizing components" is more commonly used in the analog sense of sync pulses which drive the line oscillator in a TV receiver. The use of the word signal will also be understood to include an individual component and vice versa, for example an associated signal may include a timing component or an auxiliary component of a digital video data stream. It will nevertheless be understood that the phrases used herein are intended to apply equally to analog signals and digital data streams in analog component, composite, serial and parallel; digital serial, parallel, component, composite, compressed and other forms and standards of electronic signal conveyance.

Although this invention has been described in its referred form with a certain degree of particularity, it is understood that the present disclosure of the preferred form has been made only by way of example and that numerous changes in the details of construction and the combination, arrangement and sharing of parts may be resorted to, as well as combination, arrangement and sharing of parts and elements with other functions or features, without departing from the spirit and the scope of the invention as hereinafter claimed.

What is claimed is:

1. An electronic apparatus for processing an input signal having a synchronizing component including in combination:

a) an input processing circuit responsive to said input signal to separate said synchronizing component therefrom;

b) a clock circuit for generating a pixel clock;

c) a pixel select circuit responsive to said pixel clock to select pixels corresponding to said input signal for delay;

d) a timing circuit to select a reference signal from a plurality of reference signal candidates having different relative timing and operative to provide a timing signal;

e) a variable delay circuit responsive to said timing signal and said pixels to provide a variably delayed version of said input signal synchronized in response to said reference signal;

f) a secondary signal delay circuit to variably delay a secondary signal associated with said input signal by a corresponding amount.

2. Apparatus as claimed in claim 1 wherein said input signal is a digital video signal and said clock circuit operates to provide a pixel clock having a predetermined frequency relationship with the samples of said input signal.

3. Apparatus as claimed in claim 1 wherein said input signal is a digital video signal and said delay circuit stores at least said one field of said pixels.

4. Apparatus as claimed in claim 1 wherein said synchronizing components identify the start of active video and end of active video and said clock circuit for generating a pixel clock operates to provide a known number of clocks which correspond to a known number of said pixels for the active video portion of each said horizontal line.

5. Apparatus as claimed in claim 1 wherein said input signal is a digital video signal and said delay circuit stores at least said one field of said pixels, said apparatus further including an input signal disruption circuit to detect when said input signal is disrupted, with said delay circuit responsive thereto to repetitively output at least said field of stored pixels during at least the pendency of said disruption.

6. An electronic apparatus for processing a digital input signal carried by a digital data stream having a synchronizing component including in combination:
   a) an input processing circuit responsive to said digital data stream to separate said synchronizing component therefrom;
   b) a clock circuit for generating a pixel clock;
   c) an pixel select circuit responsive to said pixel clock to select pixels corresponding to active video of said digital input signal from said digital data stream for delay;
   d) a timing circuit to select a reference signal from a plurality of reference signal candidates and operative to provide a first timing signal;
   e) a delay circuit responsive to said first timing signal and said pixels to provide a delayed version of said input signal synchronized in response to said reference signal;
   f) a second input processing circuit responsive to a second input signal to separate a synchronizing component therefrom;
   g) a second clock circuit for generating a second pixel clock;
   h) a second pixel select circuit responsive to said second pixel clock to select second pixels of said second input signal;
   i) a memory circuit responsive to a timing signal from d) which may be said first timing signal or a second timing signal and further responsive to said second pixels to provide a delayed version of said second input signal synchronized to said reference signal.

7. An apparatus responsive to a reference signal and operative with a plurality of mutually unsynchronized digital input signals carried on data streams including in combination:
   for each said digital input signal the elements of;
   a) an input processing section responsive respectively to said input signal data stream to provide synchronizing components related thereto and to provide a processed signal which is a version of said input signal;
   b) a clock section for generating a pixel clock in response to said data stream;
   c) a pixel section operative to secure pixels from said processed signal;
   d) a timing signal section responsive to said reference signal to provide a timing signal;
   e) a memory section responsive to said reference signal and said pixels to provide a delayed signal synchronized in response to said reference signal.

8. Apparatus responsive to a reference signal and operative with a plurality of unsynchronized digital input signals carried on data streams including in combination:
   for each said digital input signal the elements of;
   a) an input processing section responsive respectively to said input signal data stream to provide synchronizing components related thereto and to provide a processed signal which is a version of said input signal;
   b) a clock section for generating a pixel clock in response to said data stream;
   c) a pixel section operative to select pixels from said processed signal;
   d) a timing signal section responsive to said reference signal to provide a timing signal;
   e) a memory section responsive to said reference signal to provide a delayed signal synchronized in response to said reference signal
   f) a filter section responsive to groups of said pixels from c) to perform filtering thereof to provide filtered pixels, with said memory section from e) responsive to said filtered pixels to provide synchronization of said filtered pixels in response to said reference signal.

9. Apparatus as claimed in claim 7 further operative such that each said memory section e) is adjustable such that the timing of each said delayed signal is separately adjustable with respect to said reference signal.

10. Apparatus as claimed in claim 7 wherein reference section d) is responsive to said reference signal to provide to each said memory section e) a separately adjustable timing signal such that the timing of each said delayed signal is adjustable with respect to said reference signal.

11. Apparatus as claimed in claim 1, 2, 3, 4, 5, 6, 7, 8, 9 or 10 including a further delay section operative to delay an associated signal such that it is delayed in total in an amount corresponding to the delay of said input signal.

12. Apparatus as claimed in claim 1, 2, 3, 4, 5, 6, 7, 8, 9 or 10 wherein said element e) is operative to delay an associated signal such that it is delayed in total in an amount corresponding to the delay of said input signal, and where said associated signal is muted, modified or acted on when said input signal is disrupted.

13. Apparatus as claimed in claim 1, 2, 3, 4, 5, 6, 7, 8, 9 or 10 wherein element d) includes a reference signal detector operative to determine the presence of at least one reference signal and a selector responsive to said reference signal detector and operative to select another signal for use as said reference signal.

14. Apparatus as claimed in claim 1, 2, 3, 4, 5, 6, 7, 8, 9 or 10 wherein element d) includes a reference signal detector operative to determine the presence of at least a first candidate reference signal and a second candidate reference signal, either of which candidate signal may be said input signal; and a selector responsive to said reference signal detector and operative to select said first candidate reference signal for use as said reference signal if said first candidate signal is present and further operative to select said second candidate reference signal for use as said reference signal if said first candidate reference signal is not present, and further operative to select another signal for use as said reference signal if said second candidate reference signal is not present.

15. Apparatus as claimed in claim 1, 2, 3, 4, 5, 6, 7, 8, 9 or 10 further including:
   an image processing circuit responsive to said pixels in undelayed or relatively delayed form, or both, to change the values of ones of said pixels to thereby improve the visual quality of the image represented by said pixels.

16. Apparatus as claimed in claim 1, 2, 3, 4, 5, 6, 7, 8, 9 or 10 further including:
   a video processing circuit operative to select portions contained within the non picture areas corresponding to said delayed signal of element e) in order that said selected portions may be preserved or passed and further operating such that known ones of the repetitive portions of the non picture areas corresponding to said delayed signal of element e) are reconstituted and inserted in said delayed signal of e).

17. A method for processing an input signal having at least one synchronizing component including the steps of:
   a) separating said synchronizing component from said input signal and providing a processed signal;
   b) generating a pixel clock;
   c) securing pixels corresponding to the image conveyed by said input signal in response to said pixel clock;
   d) providing a timing signal in response to a reference signal, which reference signal may be a version of said input signal;
   e) delaying said pixels, which may be in filtered form, in a memory in response to said timing signal to provide a delayed signal synchronized in response to said reference signal;
   f) delaying an auxiliary signal associated but unsynchronized with said input signal by an amount corresponding to the delay in step e);
   g) filtering said selected pixels of step c) in delayed or undelayed form thus causing filtered pixels to be included in said delayed signal of step e).

18. The method of claim 17 wherein said input signal is a digital video signal and step b) operates to provide a pixel clock which is recovered from the digital bits of said input signal.

19. The method of claim 17 wherein in step e) said memory stores at least one repetition period worth of said pixels which are repeatedly read out of said memory for the duration of any disruption of said input signal said method further operative to mute said auxiliary signal for the duration of any said disruption.

20. The method of claim 17 wherein said input signal is in serial digital form and said synchronizing component identifies horizontal lines of active video and said step b) operates to recover from the digital bits a known number of pixel clocks which correspond to a first known number of said pixels for each said horizontal line and with said delayed signal of step e) containing a second known number of pixels for each said horizontal line.

21. The method of claim 17 wherein said input signal is a serial digital video signal which may be compressed and in step e) said memory stores at least said one frame of said pixels, and said method includes the further step of detecting when said input signal is disrupted, with said step e) responsive thereto to repetitively output said frame of stored pixels during at least the pendency of said disruption.

22. The method of claim 17 further including the steps of:
   h) a second input processing step for separating a synchronizing component from a second input signal and to provide a second processed signal;
   i) generating a second pixel clock;
   j) identifying second pixels of said second input signal in response to said second pixel clock;
   k) delaying said second pixels in response to said reference signal of d) above to provide synchronization of said second pixels to said reference signal.

23. A method for synchronizing a plurality of input signals with a reference signal which reference signal may also be an input signal, said plurality of input signals having mutually uncontrolled synchronization relative thereto said method including the following steps:
   a) for each said input signal processing said input signal to provide a synchronizing component related thereto and to provide a processed signal which is a version of said input signal;
   b) for each said input signal generating a pixel clock;
   c) for each said input signal identifying or providing pixels of the image conveyed by said processed signal;
   d) delaying said pixels in a memory section in response to said reference signal to provide a plurality of delayed signals, one of which corresponds to each said input signal and is synchronized to said reference signal.

24. The method for synchronizing a plurality of input signals with a reference signal, said plurality of input signals having mutually uncontrolled synchronization relative thereto said method including the following steps:
   a) for each said input signal processing said input signal to provide a synchronizing component related thereto and to provide a processed signal which is a version of said input signal;
   b) for each said input signal generating a pixel clock;
   c) for each said input signal identifying pixels of said processed signal;
   d) delaying said pixels in a memory section in response to said reference signal to provide a delayed signal corresponding to each said input signal each of which is synchronized to said reference signal and;
   for at least one said input signal the further step of interpolating groups of pixels from step c) to provide filtered pixels with said delaying step d) responsive to said filtered pixels in place of said pixels from step c) to provide synchronization of said filtered pixels in response to said reference signal.

25. The method of claim 23 wherein the step of delaying d) includes adjustment of the timing of each said stored signal with respect to said reference signal.

26. The method of claim 23 including the further step of providing to each said delaying step d) an adjustable timing signal such that the timing of each said delayed signal is independently adjustable with respect to said reference signal.

27. The method of claim 23, 24, 25 or 26 wherein for at least one said input signal said delaying step d) is operative to delay an auxiliary signal in an amount corresponding to the delay of the corresponding said input signal.

28. The method of claim 23, 24, 25 or 26 wherein for at least one said input signal said delaying step d) is operative to delay an auxiliary signal in an amount corresponding to the delay of the corresponding said input signal, with said auxiliary signal being muted, modified or acted on when said input signal is disrupted.

29. The method of claim 17, 18, 19, 20, 21, 22, 23, 24, 25 or 26 further including the steps of determining the presence of at least one external reference signal and selecting another signal for use as said reference signal in response thereto.

30. The method of claim 17, 18, 19, 20, 21, 22, 23, 24, 25 or 26 further including the steps of:
   determining the presence of at least a first candidate signal and a second candidate signal, either of which candidate signal may be said input signal;
   the step of selecting said first candidate signal for use as said reference signal if said first candidate signal is present;

the step of selecting said second candidate signal for use as said reference signal if said first candidate signal is not present;

The step of selecting another signal for use as said reference signal if said second candidate signal is not present.

31. The method as claimed in claim 17, 18, 19, 20, 21, 22, 23, 24, 25 or 26 further including for at least one said input signal the step of:

image processing responsive to said pixels in undelayed or relatively delayed form, or both, to modify the value of ones of said pixels to thereby improve the visual quality of the image represented by said pixels.

32. The method as claimed in claim 17, 18, 19, 20, 21, 22, 23, 24, 25 or 26 further including for at least one said input signal the step of:

processing operative to select portions contained within the non picture areas corresponding to said delayed signal from said delay section in order that said selected portions may be preserved or passed and further operating such that known ones of the repetitive portions contained within said non picture areas corresponding to said delayed signal from said delay section are reconstituted in said delayed signal from said memory section.

\* \* \* \* \*